(12) United States Patent
Lee et al.

(10) Patent No.: US 11,088,603 B2
(45) Date of Patent: Aug. 10, 2021

(54) LINE START SYNCHRONOUS RELUCTANCE MOTOR AND ROTOR THEREOF

(71) Applicant: Hyosung Heavy Industries Corporation, Seoul (KR)

(72) Inventors: Su Jin Lee, Changwon-si (KR); Liang Fang, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 167 days.

(21) Appl. No.: 16/468,519

(22) PCT Filed: Dec. 13, 2017

(86) PCT No.: PCT/KR2017/014637
§ 371 (c)(1),
(2) Date: Jun. 11, 2019

(87) PCT Pub. No.: WO2018/110971
PCT Pub. Date: Jun. 21, 2018

(65) Prior Publication Data
US 2020/0091804 A1 Mar. 19, 2020

(30) Foreign Application Priority Data
Dec. 16, 2016 (KR) .................. 10-2016-0173018

(51) Int. Cl.
*H02K 19/06* (2006.01)
*H02K 1/24* (2006.01)
(Continued)

(52) U.S. Cl.
CPC ............. *H02K 19/06* (2013.01); *H02K 1/246* (2013.01)

(58) Field of Classification Search
CPC ...... H02K 17/16; H02K 17/165; H02K 17/26; H02K 21/46; H02K 19/06; H02K 19/14; H02K 1/246
(Continued)

(56) References Cited

U.S. PATENT DOCUMENTS 2,483,848 A * 10/1949 Saretzky ............... H02K 19/14
310/162
3,597,646 A 8/1971 Lawrenson
(Continued)

FOREIGN PATENT DOCUMENTS

DE 102016211841 A1 * 1/2018 ............ H02K 19/06
EP 1524755 A1 4/2005
(Continued)

OTHER PUBLICATIONS

M. Sanada et al. "Torque ripple improvement for synchronous reluctance motor using asymmetric flux barrier arrangement," 38th IAS Annual Meeting on Conference Record of the Industry Applications Conference, 2003., Salt Lake City, UT, USA, 2003, pp. 250-255 vol.1, DOI: 10.1109/IAS.2003.1257510. (Year: 2003).*

*Primary Examiner* — Burton S Mullins
(74) *Attorney, Agent, or Firm* — Novick, Kim & Lee, PLLC; Jae Yoon Kim

(57) ABSTRACT

The present invention relates to a line start synchronous reluctance motor and a rotor thereof. To this end, the present invention provides a line start synchronous reluctance motor including: a rotor; a plurality of conductor bars disposed on a side of an outer circumferential portion of the rotor; and flux barriers formed at an inner side of the rotor so as to be close to the conductor bars, wherein the flux barriers, which are formed in separate regions of a body of the rotor that are arranged to have opposite polarities, are formed to be asymmetrical to each other. Therefore, the present invention improves characteristics of the motor through the asym-
(Continued)

metrical flux-barrier structure without changing the number of conductor bars, thereby allowing the initial starting of the motor to be smoothly performed, which is advantageous in terms of torque ripple characteristics and die casting.

5 Claims, 5 Drawing Sheets

(51) Int. Cl.
*H02K 19/14* (2006.01)
*H02K 21/46* (2006.01)

(58) Field of Classification Search
USPC .......................................................... 310/211
See application file for complete search history.

(56) References Cited

U.S. PATENT DOCUMENTS

| | | | |
|---|---|---|---|
| 3,721,844 A | 3/1973 | Fong | |
| 4,074,160 A * | 2/1978 | Broadway | H02K 1/246 310/112 |
| 5,903,080 A * | 5/1999 | Nashiki | H02K 1/246 310/162 |
| 6,088,906 A * | 7/2000 | Hsu | H02K 15/0012 310/211 |
| 7,282,829 B2 * | 10/2007 | Jung | H02K 1/246 310/211 |
| 7,425,808 B2 * | 9/2008 | Kamiya | B60L 7/16 318/376 |
| 2016/0352161 A1 * | 12/2016 | Lange | H02K 1/246 |

FOREIGN PATENT DOCUMENTS

| | | | | |
|---|---|---|---|---|
| GB | 1347561 | * | 2/1974 | ............ H02K 19/24 |
| GB | 1448990 A | | 9/1976 | |
| JP | 2003-259615 A | | 9/2003 | |
| JP | 2004-254396 A | | 9/2004 | |
| KR | 10-2005-0035783 A | | 4/2005 | |
| KR | 10-056522 B1 | | 3/2006 | |
| KR | 10-2008-0061037 A | | 7/2008 | |
| WO | 2014124729 A2 * | | 8/2014 | ............ H02K 1/246 |
| WO | 2016-020363 A1 | | 2/2016 | |

* cited by examiner

LINE START SYNCHRONOUS RELUCTANCE MOTOR AND ROTOR THEREOF

TECHNICAL FIELD

The present invention relates to a line start synchronous reluctance motor, and more particularly, to a line start synchronous reluctance motor and a rotor thereof capable of improving characteristics of the motor through an asymmetrical flux-barrier structure without changing the number of conductor bars.

BACKGROUND ART

Generally, a line start synchronous reluctance motor is a motor using the principle that a rotating force is generated by a change in magnetic resistance according to rotation of a rotor and is widely used for a compressor or the like. A rotor of the line start synchronous reluctance motor includes a core formed by laminating a plurality of steel sheets, wherein the core has a plurality of flux barriers and a steel part on which the flux barrier is not formed.

When the rotor is started, a flow of magnetic flux is interfered by the flux barriers, and magnetic resistance varies in a direction along a side of the flux barrier, that is, the q-axis, and in a direction along portions between flux barrier groups in a circumferential direction of the rotor, that is, the d-axis. Reluctance torque is generated due to a difference between magnetic resistances in the d-axis and the q-axis. Since the reluctance torque is synchronized with magnetic flux of a stator, the reluctance torque is more dominant than induction-type torque due to bars of the rotor, and thus the rotor rotates at a synchronous speed due to the reluctance torque.

Meanwhile, output of an induction-type motor changes according to combinations of the number of slots formed in a stator and the number of conductor bars formed in a rotor. In this case, while required performance characteristics are satisfied when forty-four conductor bars are disposed in a four-pole rotor, the required performance characteristics are not satisfied when forty-two or forty-eight conductor bars are disposed in the same four-pole rotor.

As a way to satisfy such performance characteristics, FIG. 4 illustrates a permanent magnet (PM) motor which is line-started by a PM 720 being inserted into a rotor 700 of an induction-type motor that has conduction bars 710 as illustrated, as a rotor of a motor using a PM, such that motor efficiency is more improved during synchronized operation after self-starting as compared with the induction-type motor.

However, since the conductor bars 710 are uniformly distributed inside the rotor 700, the number of conductor bars per pole of the PM 720 is 44/4=11, and a structure of the PM 720 with respect to the conductor bars 710 is symmetrical, that is, each pole has eleven conductor bars, there is a problem in that the line start (starting) characteristic is not smooth.

Also, in the case of a synchronous reluctance motor (SynRM) which is line-started by flux barriers 820 being disposed in a rotor 800 of an induction-type motor that has conduction bars 810 as illustrated in FIG. 5, motor efficiency is more improved during synchronized operation after self-starting as compared with the induction-type motor.

However, since the rotor 800 of the induction-type motor has six poles and forty-four conductor bars 810 and thus the number of conductor bars 810 per pole is 44/6=7.33, there is a problem in that, when the number of conductor bars 810 is changed to forty-two, forty-eight, or the like, the number of flux barriers 820 is an integer related to the number of conductor bars 810 per pole, and the flux barriers 820 are disposed symmetrically such that the output characteristic is degraded due to changing the starting characteristic.

This also leads to a problem in that the structure is disadvantageous in terms of torque ripple characteristics and die casting.

DISCLOSURE

Technical Problem

The present invention is directed to providing a line start synchronous reluctance motor and a rotor thereof capable of improving characteristics of the motor through an asymmetrical flux-barrier structure without changing the number of conductor bars, thereby allowing the initial starting of the motor to be smoothly performed, which is advantageous in terms of torque ripple characteristics and die casting.

Technical Solution

The present invention provides a line start synchronous reluctance motor including: a rotor; a plurality of conductor bars disposed on a side of an outer circumferential portion of the rotor; and flux barriers formed at an inner side of the rotor so as to be close to the conductor bars, wherein the flux barriers, which are formed in separate regions of a rotor body that are arranged to have opposite polarities, are formed to be asymmetrical to each other.

In the rotor, a shaft hole may be formed in an axial direction at the center of the rotor body having a cylindrical shape, conductor bar insertion holes may be formed at predetermined intervals at an inner side of the outer circumferential portion, and flux-barrier insertion holes may be formed between the shaft hole and the conductor bar insertion holes.

The conductor bars may be arranged at predetermined intervals at a portion close to an outer circumferential portion of the rotor body.

The conductor bars may be arranged asymmetrically in the separate regions of the rotor body that are arranged to have opposite polarities.

The conductor bars may each include: a conductor bar body having a tapered portion whose width gradually narrows toward the center of the rotor body; and a conductor bar head portion in a semi-circular shape that is formed at each of both side ends of the conductor bar body.

In the flux barriers, a first unit barrier may be formed between an inner side portion of one-side conductor bar and an inner side portion of the other-side conductor bar between which a maximum distance is formed inside the separate regions of the rotor body, and a second unit barrier may be repeatedly formed between an inner side portion of one-side conductor bar and an inner side portion of the other-side conductor bar between which a maximum distance is formed inside separate regions between the first unit barrier and the outer circumferential portion of the rotor body.

The first unit barrier and the second unit barrier may be formed to have a shape that is bent toward the center of the rotor body.

Advantageous Effects

According to the present invention, there is an advantageous effect in that line-starting can be smoothly performed by uniformly distributing conductor bars during initial starting by using asymmetrical flux barriers, without changing the number of conductor bars disposed in a rotor of a line start synchronous reluctance motor.

In this way, there is an advantageous effect in that, since a separate starting inverter is not required, the cost is reduced.

In this way, there is an advantageous effect in that such conditions are advantageous in terms of torque ripple characteristics.

In this way, there is an advantageous effect in that characteristics of a synchronous motor are improved.

In this way, there is an advantageous effect in that such a flux-barrier structure is more advantageous in terms of die casting.

MODES OF THE INVENTION

Figure 1:
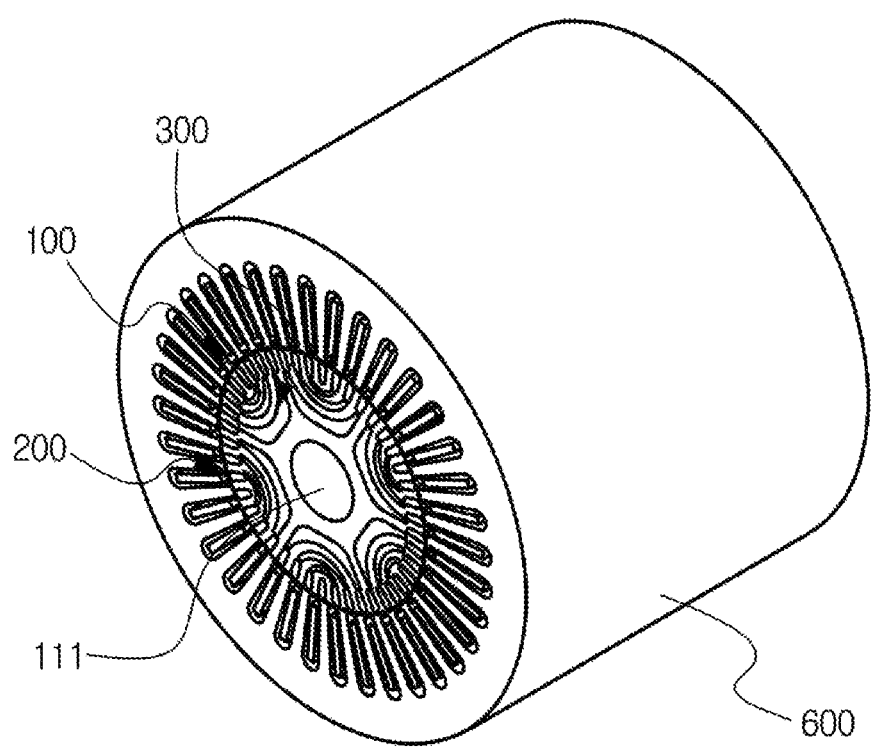
FIG. 1 is a perspective view illustrating a stator and a rotor of a line start synchronous reluctance motor according to the present invention.

Hereinafter, specific embodiments for embodying the present invention will be described with reference to the accompanying drawings.

In describing the present invention, terms including ordinals such as first and second may be used to describe various elements, but the elements are not limited by the terms. The terms are only used for the purpose of distinguishing one element from another element. For example, a first element may be referred to as a second element while not departing from the scope of the present invention, and likewise, a second element may also be referred to as a first element.

When it is mentioned that a certain element is "connected" or "linked" to another element, although the certain element may be directly connected or linked to the other element, it should be understood that another element may exist therebetween.

Terms used herein are merely used to describe particular embodiments and are not intended to limit the present invention. A singular expression includes a plural expression unless the context clearly indicates otherwise.

In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

In the drawings, the shapes, sizes, and the like of elements may be exaggerated for clarity.

Figure 2:
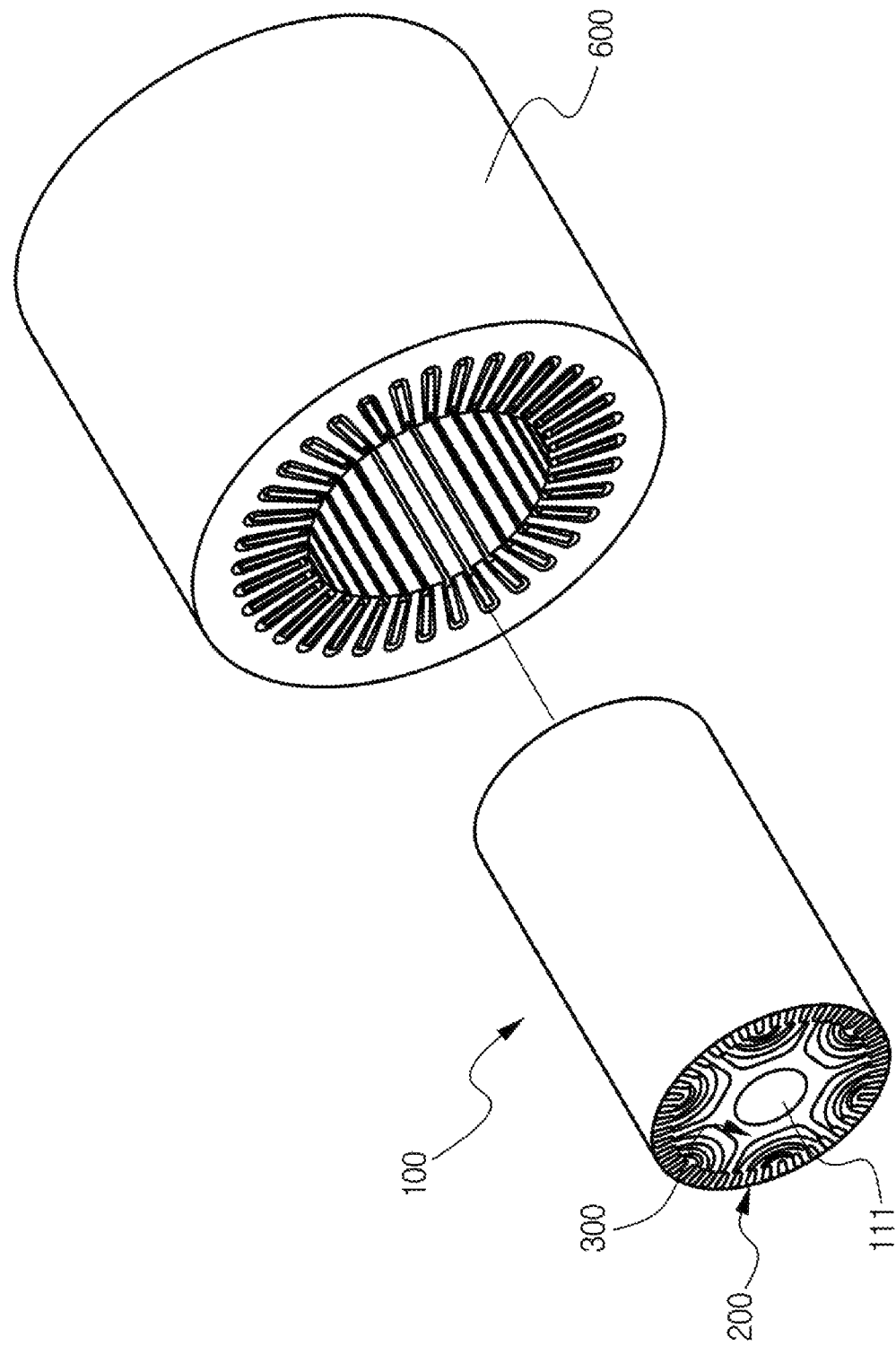
FIG. 2 is an exploded perspective view of the stator and the rotor of the line start synchronous reluctance motor according to the present invention.
Figure 3:
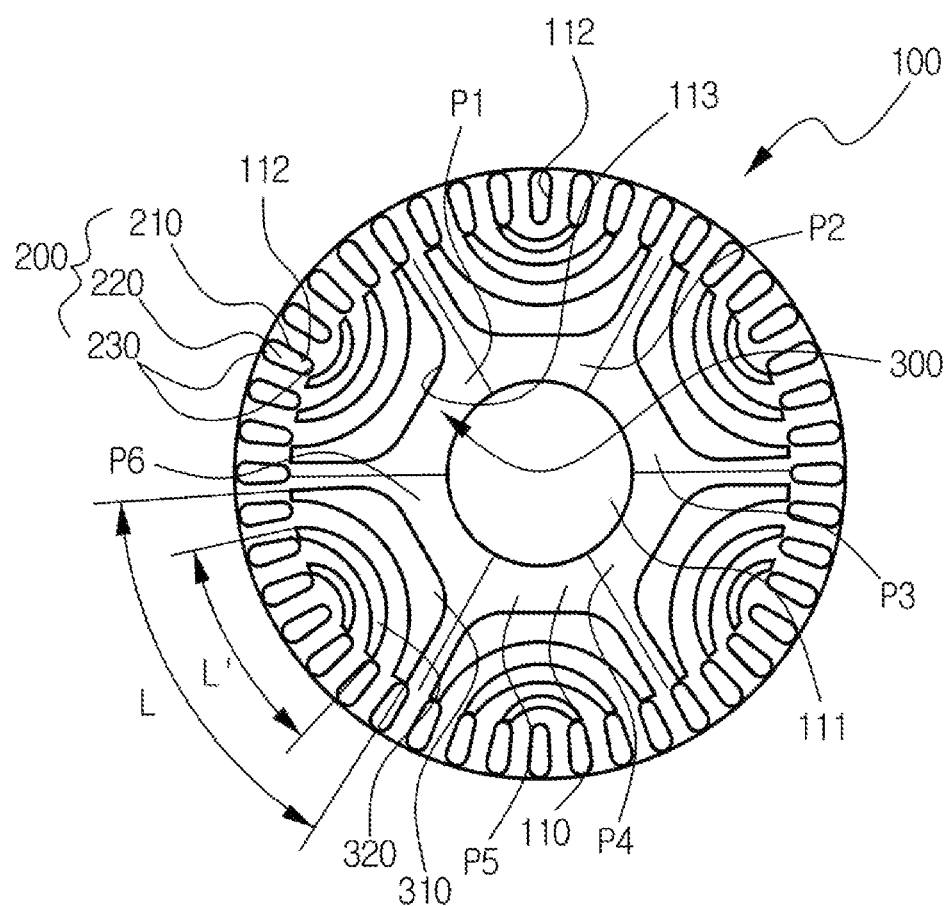
FIG. 3 is a longitudinal cross-sectional view illustrating the stator and the rotor of the line start synchronous reluctance motor according to the present invention.
Figure 4:
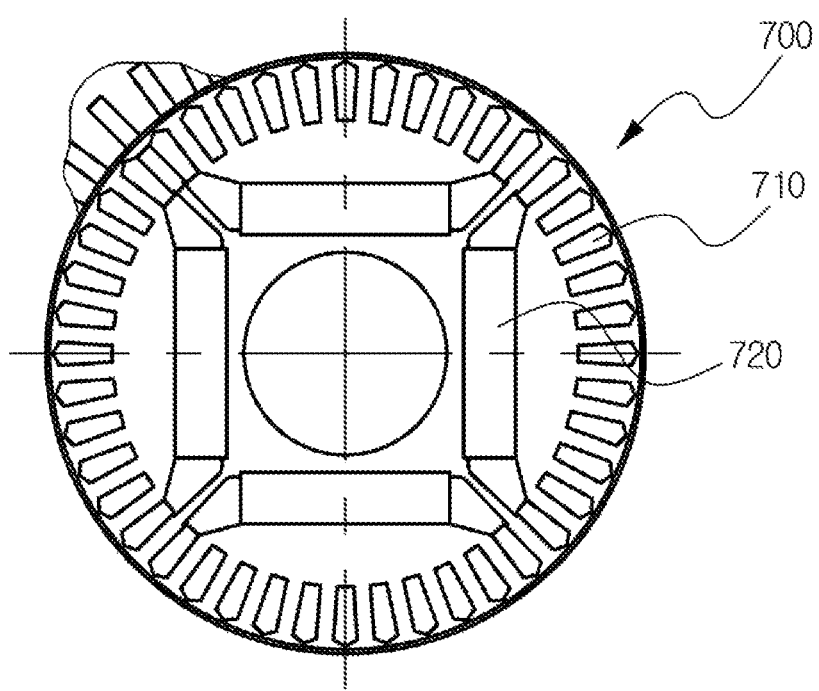
FIGS. 4 and 5 are longitudinal cross-sectional views illustrating a stator and a rotor of a motor according to the related art.
Figure 5:
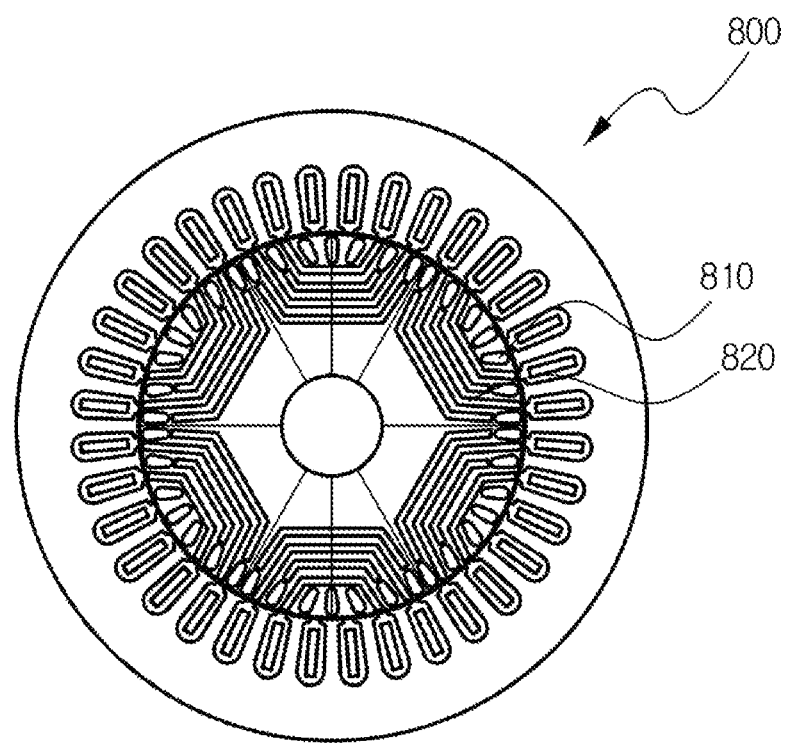

FIG. 1 is a perspective view illustrating a stator and a rotor of a line start synchronous reluctance motor according to the present invention, FIG. 2 is an exploded perspective view of the stator and the rotor of the line start synchronous reluctance motor according to the present invention, and FIG. 3 is a longitudinal cross-sectional view illustrating the stator and the rotor of the line start synchronous reluctance motor according to the present invention.

The line start synchronous reluctance motor according to the present invention allows line starting to be smoothly performed without using an inverter during initial starting, which is advantageous in terms of torque ripple characteristics and die casting. The line start synchronous reluctance motor according to the present invention includes a rotor 100, conductor bars 200, and flux barriers 300.

Here, as illustrated in FIGS. 1 to 3, the rotor 100 is rotatably inserted into a stator 600. The rotor 100 includes a product of an extrusion method using die casting that is cut to a predetermined length.

In such a rotor 100, a shaft hole 111 having a predetermined diameter is formed in an axial direction at the center of a rotor body 110 having a cylindrical shape, conductor bar insertion holes 112 are formed at predetermined intervals at an inner side of an outer circumferential portion of the rotor 100, and the conductor bars 200 are disposed in uniform distribution.

The flux barriers 300 are disposed in flux-barrier insertion holes 113 which are formed between the shaft hole 111 and the conductor bar insertion holes 112 so that characteristics of the motor are improved.

As illustrated in FIG. 3 with alternate long and short dash lines, opposite polarities may be repeatedly arranged in the rotor body 110, and the rotor body 110 may be divided into first, second, third, fourth, fifth, and sixth regions P1, P2, P3, P4, P5, and P6 whose polarities are different from each other.

The conductor bars 200 are repeatedly arranged at predetermined intervals at a side of the outer circumferential portion of the rotor 100 along the outer circumferential portion. Forty-four conductor bars 200 are arranged at predetermined intervals at a portion close to an outer circumferential portion of the rotor body 110.

Such conductor bars 200 each include a conductor bar body 220 having a tapered portion 210 whose width gradually narrows toward the center of the rotor body 110 and a conductor bar head portion 230 in a semi-circular shape that is formed at each of both side ends of the conductor bar body 220. In this way, the conductor bars 200 may be maintained at predetermined intervals.

Seven conductor bars 200, eight conductor bars 200, seven conductor bars 200, seven conductor bars 200, eight conductor bars 200, and seven conductor bars 200 are arranged to be asymmetrical to each other in the first, second, third, fourth, fifth, and sixth separate regions P1, P2, P3, P4, P5, and P6, respectively, of the rotor body 110 that are arranged to have opposite polarities.

The flux barriers 300 are repeatedly formed by being separated at predetermined intervals at an inner side of the rotor 100 so as to be close to the conductor bars 200. A first unit barrier 310 is formed between an inner side portion of one-side conductor bar 200 and an inner side portion of the other-side conductor bar 200 between which a maximum distance L is formed inside the separate regions of the rotor body 110.

A second unit barrier 320 is formed between an inner side portion of one-side conductor bar 200 and an inner side portion of the other-side conductor bar 200 between which a maximum distance L' is formed inside separate regions between the first unit barrier 310 and the outer circumferential portion of the rotor body 110.

In addition, another unit barrier having the same shape as the second unit barrier 230 is repeatedly formed at an inner portion of the second unit barrier 230. That is, the unit barriers are arranged in multiple layers. In this case, it is preferable that the unit barriers have a shape that is bent toward the center of the rotor body 110.

The above-described rotor for a line start synchronous reluctance motor is formed by an extrusion method using die casting so that, first, the shaft hole 111 having a predetermined diameter is formed in an axial direction at the center of a rotor body 110 having a cylindrical shape, the conductor bar insertion holes 112 are formed at predetermined intervals at the inner side of the outer circumferential portion of the rotor, and multiple layers of the flux-barrier insertion holes 113, whose sizes vary, are formed between the shaft hole 111 and the conductor bar insertion holes 112.

Next, after the product of the extrusion method is cut to a predetermined length, conductors and flux barriers are inserted or injected into the conductor bar insertion holes 112 and the multiple layers of the flux-barrier insertion holes 113, respectively, and hardened, and then both side surfaces of the rotor are processed, thereby obtaining the rotor.

In the rotor obtained by the above process, forty-four conductor bars 200 are arranged at predetermined intervals in the first, second, third, fourth, fifth, and sixth separate regions P1, P2, P3, P4, P5, and P6 in which opposite polarities are repeatedly arranged, and seven conductor bars 200, eight conductor bars 200, seven conductor bars 200, seven conductor bars 200, eight conductor bars 200, and seven conductor bars 200 are arranged to be asymmetrical to each other in the first, second, third, fourth, fifth, and sixth separate regions P1, P2, P3, P4, P5, and P6, respectively.

Since the flux barriers 300 including the first unit barrier 310, the second unit barrier 320, and the like are formed in each of the first, second, third, fourth, fifth, and sixth separate regions P1, P2, P3, P4, P5, and P6, characteristics of the motor can be improved. That is, line-starting can be smoothly performed by uniformly distributing conductor bars during initial starting by using the asymmetrically-formed flux barriers 300, without changing the number of conductor bars 200 disposed in the rotor.

Note that the above-described embodiments are for describing the present invention and are not intended to limit the present invention. Also, those of ordinary skill in the art to which the present invention pertains should understand that various other embodiments are possible within the scope of the technical idea of the present invention.

| *Description of reference numerals | |
|---|---|
| 100: rotor | 110: rotor body |
| 111: shaft hole | 112: conductor bar insertion hole |
| 113: flux barrier insertion hole | 200: conductor bar |
| 210: tapered portion | 220: conductor bar body |
| 230: conductor bar head portion | 300: flux barrier |
| 310: first unit barrier | 320: second unit barrier |
| P1, P2, P3, P4, P5, P6: first, second, third, fourth, fifth, sixth separate regions | |

INDUSTRIAL APPLICABILITY

The present invention relates to a line start synchronous reluctance motor that is usable in the field of motors.

The invention claimed is:

1. A line start synchronous reluctance motor comprising:
a rotor;
a plurality of conductor bars disposed on a side of an outer circumferential portion of the rotor; and
flux barriers formed at an inner side of the rotor so as to be close to the conductor bars,
wherein the rotor comprises a rotor body comprising six separate regions (P1, P2, P3, P4, P5, P6) which are arranged to have opposite polarities,
wherein the flux barriers, which are formed in the separate regions of the rotor body that are arranged to have opposite polarities, are formed to be asymmetrical to each other,
wherein the plurality of conductor bars are arranged asymmetrically in the separate regions of the rotor body that are arranged to have opposite polarities,
wherein seven conductor bars, eight conductor bars, seven conductor bars, seven conductor bars, eight conductor bars and seven conductor bars of the plurality of the conductor bars are arranged to be asymmetrical to each other in the first, second, third, fourth, fifth, and sixth separate regions (P1, P2, P3, P4, P5, P6), respectively, of the rotor body that are arranged to have opposite polarities, and
wherein in the flux barriers, a first unit barrier is formed between an inner side portion of one-side conductor bar and an inner side portion of the other-side conductor bar between which a maximum distance is formed inside the separate regions of the rotor body, and a second unit barrier is repeatedly formed between an inner side portion of one-side conductor bar and an inner side portion of the other-side conductor bar between which a maximum distance is formed inside separate regions between the first unit barrier and the outer circumferential portion of the rotor body, and a third unit barrier is repeatedly formed between an inner side portion of one-side conductor bar and an inner side portion of the other-side conductor bar between which a maximum distance is formed inside separate regions between the second unit barrier and the outer circumferential portion of the rotor body.

2. The line start synchronous reluctance motor of claim 1, wherein:
a shaft hole is formed in an axial direction at the center of the rotor body having a cylindrical shape;
conductor bar insertion holes are formed at predetermined intervals at an inner side of the outer circumferential portion; and
flux-barrier insertion holes are formed between the shaft hole and the conductor bar insertion holes.

3. The line start synchronous reluctance motor of claim 1, wherein the plurality of conductor bars are arranged at predetermined intervals at a portion close to an outer circumferential portion of the rotor body.

4. The line start synchronous reluctance motor of claim 1, wherein the plurality of conductor bars each include:
a conductor bar body having a tapered portion whose width gradually narrows toward the center of the rotor body; and
a conductor bar head portion in a semi-circular shape that is formed at each of both side ends of the conductor bar body.

5. The line start synchronous reluctance motor of claim 1, wherein the first unit barrier, the second unit barrier, and the third unit barrier are formed to have a shape that is bent toward the center of the rotor body.

* * * * *